United States Patent Office 2,813,743
Patented Nov. 19, 1957

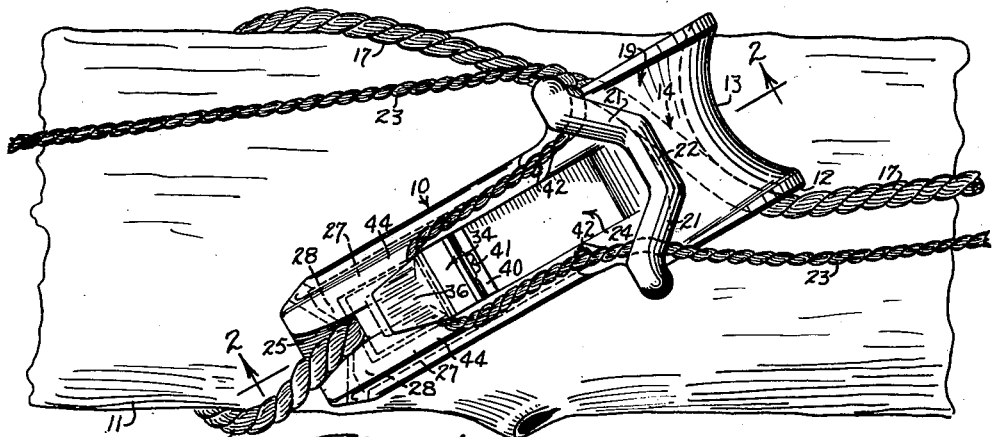
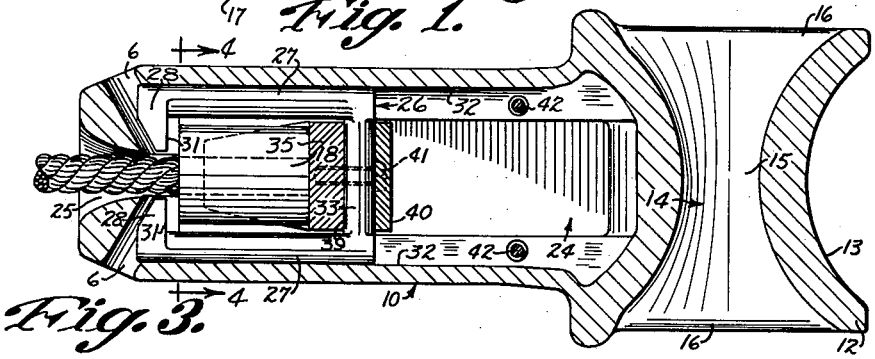
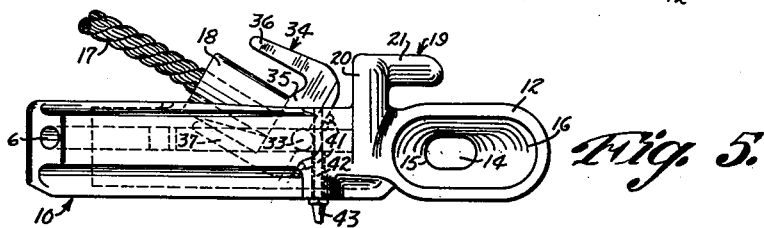
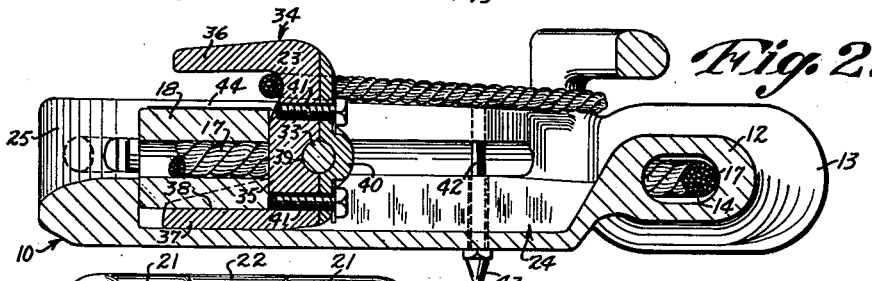
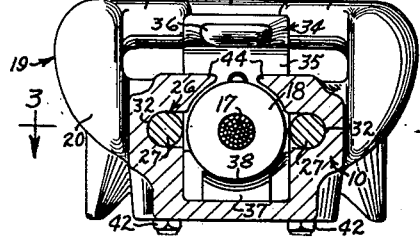

2,813,743
HITCH
Adolph Leslie Andersen, Monroe, Wash.
Application July 19, 1956, Serial No. 598,899
4 Claims. (Cl. 294—74)

This invention relates to a hitch or choker, and more particularly to a hitch for handling timber or the like.

The object of the invention is to provide a hitch which is especially suitable for use in handling timber and which includes a novel means for releasing the hitch from the timber or other article being handled.

In the accompanying drawing:

Figure 1 is an elevational view illustrating the hitch of the present invention being used and being mounted on a log or piece of timber or the like.

Figure 2 is a sectional view taken on the line 2—2 of Figure 1.

Figure 3 is a sectional view taken on the line 3—3 of Figure 4.

Figure 4 is a sectional view taken on the line 4—4 of Figure 3.

Figure 5 is a side elevational view illustrating the position of the parts when the ferrule is being ejected.

Referring in detail to the drawings, the numeral 10 designates a housing or body member which is adapted to be arranged contiguous to a piece of timber or log 11 as when the log 11 is to be moved, raised or otherwise handled.

Formed integral with an end of the body member 10 or secured thereto is an enlarged head 12 which may have its outer surface shaped arcuately or curved as at 13 so that it will ease the twisting grind of the choker cable which would otherwise kink and break. The head 12 is provided with a transversely extending opening 14 which includes an intermediate narrow portion 15 and wide end portions 16. A cable 17 extends through the opening 15. A conventional cylindrical ferrule 18 is arranged on an end of the cable 17, and the ferrule 18 is secured to the cable 17 in any suitable manner. The cable 17 may be made of any suitable material such as steel.

Extending outwardly from the body member 10 and secured thereto or formed integral therewith is a bracket 19, and the bracket 19 includes a first pair of spaced parallel portions 20 which have extending therefrom a second pair of angularly arranged portions 21. A third portion 22 extends between the portions 21, Figure 1. A haul back line 23 is arranged in engagement with the bracket 19.

There is further provided a movable guide member 26 which includes a pair of spaced parallel arms 27 that slidably engage opposed grooves 32 which are arranged in the body member 10. Extending inwardly from the free ends of each of the arms 27 is a finger 28 which is adapted to engage the shoulders of the ferrule 18. Mud holes 6 are provided in order to facilitate cleaning out of the device so as to prevent mud from becoming packed in the device in the event that there were no mud holes therein. The fingers 28 include flat surfaces 31, and a shank 33 extends between the pair of arms 27 and connects the arms 27 together.

The hitch of the present invention further includes a pivotally mounted support member 34 which includes a web 35 that has a pair of spaced apart jaws 36 and 37 extending therefrom. The inner surface of the jaw 37 may be curved or shaped arcuately as at 38 for snugly receiving therein the ferrule 18, Figure 4. The support member 34 is provided with a groove 39 through which extends the shank 33, and a clamping plate 40 is connected to the support member 34 through the medium of suitable securing elements such as the bolts 41, Figure 2.

Extending transversely through the body member 10 is a pair of pins 42, and the pins 42 are adapted to be engaged or abutted by portions of the guide member 26 so as to limit sliding movement of the guide member 26 in the body member 10. End portions of the pins 42 may extend beyond the body member 10, and these portions may be tapered or pointed as at 43 so that the end portion 43 may dig into the log 11 so as to help anchor the device. Portions of the body member 10 are cutaway so as to define opposed lips 44, and the lips 44 terminate at a point intermediate the ends of the body member. Due to the provision of the lips 44, the support member 34 is at times restrained from pivoting on the shank 33, but when the support member 34 moves to the position shown in Figure 5, the jaws 36 move beyond the lips 44 so that the support member 34 can pivot on the shank 33 whereby the ferrule 18 will be forceably moved out of the space between the jaws 36 and 37.

From the foregoing, it is apparent that there has been provided a timber hitch or choker which is especially suitable for use in manipulating or handling articles such as logs, timber or the like. In use, the device can be arranged as shown in the drawings or as shown in Figure 1 wherein the cable 17 extends through the opening 14 in the head 12 and this cable 17 is then wrapped around the log 11. The cable 17 has the ferrule 18 secured to its end, and when the device is in locked position, the ferrule 18 is seated in the space between the jaws 36 and 37 of the support member 34. With the parts in locked position as shown in Figures 1 through 4, the ferrule 18 is positioned below the lips 44 so that with tension applied to the cable 17, the lips 44 prevent the ferrule 18 from being removed from the body member 10. However, when it is desired to release the hitch, it is only necessary to apply tension or pull on the cable 23. It is to be noted that the cable 23 engages the bracket 19 and is also arranged in engagement with the pivotally mounted support member 34 so that by pulling on the cable 23, the support member 34 will be moved forwardly from the position shown in Figures 1 through 4 to the position shown in Figure 5. As the support member 34 moves forwardly, the arms 27 of the guide member 26 will slide forwardly in the grooves 32 until the guide member 26 strikes the pins 42, so that the pins 42 will act as a stop member to limit sliding movement of the guide member 26. As soon as the support member 34 and guide member 26 have moved forwardly sufficiently to permit the jaw 36 to pass beyond or clear the lips 44, then the support member 34 will pivot on the shaft or shank 33 to the position shown in Figure 5 whereby the ferrule 18 will be ejected from the space between the jaws 36 and 37 of the support member 34. Thus, with the parts arranged as shown in Figure 5, the ferrule 18 will be readily ejected. The opening 16 in the head 12 has the cable 17 extending therethrough. The clamping plate 40 coacts with the web 35 of the support member 34 to provide a recess or groove through which projects the shank 33 of the guide member 26. The inner surface of the jaw 37 is curved as at 38 so that it snugly conforms to the configuration of the cylindrical ferrule 18, Figure 4.

As the support member 34 pivots to the position shown in Figure 5 by action of the haul back line 23, the ferrule 18 is automatically raised from the position shown in Figures 1 through 4 to the position shown in Figure 5 so that it is forceably ejected. The various corners or outer portions of the device are shaped so that they will not accidentally catch on objects as the device is used in wooded areas or the like. The ferrule 18 may be made of steel which can be welded to the cable 17 in the usual manner. The entire device can be cast from tough manganese steel or any other suitable material. The present invention is especially suitable for use in clearing land or where it is desired to stack large sections of stumps, logs, trees or the like in a pile, as when it is hard work to get up and unhitch and also extremely dangerous to perform this operation. The present invention can be used in other areas as for example, it can be used for stacking logs around a sawmill yard as a reserve supply. The size of the device can be varied as desired. Furthermore, there are no parts which will readily get out of order. The logging hitch of the present invention can be unhitched by the operation of a logging "donkey" without the operator leaving the donkey, since the device can be unhitched by the haul back line 23, regardless of the distance. The haul back line 23 is looped through the bracket 19 and arranged in engagement with the support member 34, the support member 34 being pivotally mounted on the shank 33 so that when the haul back line is pulled, the ferrule 18 will be forced upwardly to the position shown in Figure 5 and at the same time the haul back will be freed so as to complete the operation. The sharp pointed ends 43 on the bolts or pins 42 may serve as calks so as to help insure that the device properly grips logs 11 especially when such logs 11 are slippery or wet. The end of the line 23 which extends off to the left in Figure 1 may lead to the donkey, and the cable 17 may constitute the choker.

The curvature of the head insures or serves to ease the twisting grind of the choker cable which would otherwise kink and break. After the hitch has been once installed on the choker cable, it is not necessary to reinsert the cable in the head. The hitching device can slide from one end of the cable to the other but cannot get off, so that the entire rigging is reversible. Thus, either end of the cable can be used around the timber so that the life of the cable will be doubled since it is always the choking end which wears. The other end of the cable is taken care of in the butt rigging. It is to be understood that the cable and ferrule are of conventional construction and form no part of the present invention. The mud holes 6 permits mud or other foreign matter to pass therethrough so that mud or the like will not become packed in the housing or body member. When the parts move to the position shown in Figure 5, the ferrule 18 is kicked out with a positive force. When hauling strain is exerted on the choker 17, the ferrule 18 rests firmly against the anvil-like banks which are integral with the housing or body.

I claim:

1. In a hitch, a body member provided with a head on one end thereof, there being an opening in said head extending transversely with respect to the longitudinal axis of said body member, a first cable extending through said opening and surrounding an article being handled and said cable having a cylindrical ferrule on an end thereof, there being a cutout in said body member extending parallel to the longitudinal axis of said body member, there being a recess in the end of said body member which is opposite from said head for the passage therethrough of a portion of said cable, a bracket extending from said body member and including a first pair of spaced parallel portions, second portions extending angularly from said first portions, a third portion extending between said pair of second portions, a haul back line arranged in engagement with said bracket, there being a pair of spaced parallel grooves arranged in said body member and communicating with said cutout, a guide member including a pair of spaced parallel arms slidably arranged in said grooves, a shank extending between said arms, a pair of pins extending transversely through said body member for selective engagement by said guide member, a support member pivotally mounted on said shank, said support member including a pair of spaced apart jaws for receiving therebetween said ferrule, portions of said body member being shaped to define lips for preventing pivotal movement of said support member, said lips terminating at a point intermediate the ends of said body member so that when the guide member and support member move beyond a predetermined point, the support member can pivot on the shank so as to permit removal of the ferrule from the space between the jaws.

2. The structure as defined in claim 1 wherein end portions of said pins are pointed, and wherein the outer surface of said head is curved.

3. The structure as defined in claim 1 wherein end portions of said pins are pointed and project beyond the said body member, the outer surface of said head being curved, and a finger extending transversely inwardly from each of said arms, each of said fingers adapted to engage shoulders of the ferrule.

4. In a hitch, a body member provided with a head on one end thereof, there being an opening in said head, a first cable extending through said opening and surrounding an article being handled and said cable having a ferrule on an end thereof, there being a cutout in said body member, there being a recess in the end of said body member which is opposite from said head for the passage therethrough of a portion of said cable, a bracket extending from said body member and including a first pair of portions, second portions extending angularly from said first portion, a third portion extending between said pair of second portions, a haul back line arranged in engagement with said bracket, there being a pair of grooves arranged in said body member and communicating with said cutout, a guide member including a pair of arms slidably arranged in said grooves, a shank extending between said arms, a pair of pins extending through said body member for selective engagement by said guide member, a support member pivotally mounted on said shank, said support member including a pair of spaced apart jaws for receiving therebetween said ferrule, portions of said body member being shaped to define lips for preventing pivotal movement of said support member, said lips terminating at a point intermediate the ends of said body member so that when the guide member and support member move beyond a predetermined point, the support member can pivot on the shank so as to permit removal of the ferrule from the space between the jaws.

References Cited in the file of this patent
UNITED STATES PATENTS

| 59,890 | Bristol | Nov. 20, 1866 |
| 1,247,194 | White | Nov. 20, 1917 |
| 1,381,616 | Clausen et al. | June 14, 1921 |